(12) United States Patent
Zhou et al.

(10) Patent No.: US 9,982,732 B2
(45) Date of Patent: May 29, 2018

(54) VEHICLE BRAKE ROTOR AND METHOD OF MAKING SAME

(71) Applicant: GRI Engineering & Development, LLC, Long Grove, IL (US)

(72) Inventors: Mingxu Zhou, Buffalo Grove, IL (US); Edgar Calago, Lake Villa, IL (US)

(73) Assignee: GRI ENGINEERING & DEVELOPMENT, LLC, Long Grove, IL (US)

( * ) Notice: Subject to any disclaimer, the term of this patent is extended or adjusted under 35 U.S.C. 154(b) by 5 days.

(21) Appl. No.: 14/817,833

(22) Filed: Aug. 4, 2015

(65) Prior Publication Data

US 2017/0037917 A1 Feb. 9, 2017

(51) Int. Cl.
| | | |
|---|---|---|
| *F16D 65/12* | (2006.01) | |
| *B22D 19/16* | (2006.01) | |
| *B22D 19/04* | (2006.01) | |
| *F16D 65/02* | (2006.01) | |

(52) U.S. Cl.
CPC ........... *F16D 65/123* (2013.01); *B22D 19/04* (2013.01); *B22D 19/16* (2013.01); *F16D 2065/1312* (2013.01); *F16D 2065/1328* (2013.01); *F16D 2065/1348* (2013.01); *F16D 2200/0013* (2013.01); *F16D 2200/0026* (2013.01)

(58) Field of Classification Search
CPC ........... F16D 2065/1316; F16D 65/123; F16D 65/125; F16D 2065/1312; F16D 2065/1328; F16D 2065/1348; F16D 2200/0013; F16D 2200/0026; B22D 19/16; B22D 19/04
See application file for complete search history.

(56) References Cited

U.S. PATENT DOCUMENTS

| | | | |
|---|---|---|---|
| 1,553,670 A * | 9/1925 | Cautley | ............... F16D 65/10 188/218 R |
| 2,088,191 A * | 7/1937 | Eksergian | ............... F16D 65/10 188/218 R |
| 2,162,072 A * | 6/1939 | Eksergian | ............... F16D 65/10 188/218 R |
| 5,520,269 A | 5/1996 | Yamamoto et al. | |
| 5,560,455 A | 10/1996 | Atmur et al. | |
| 6,035,978 A | 3/2000 | Metzen et al. | |
| 6,216,828 B1 | 4/2001 | Burger | |
| 6,279,697 B1 | 8/2001 | Dickerson et al. | |
| 6,287,500 B1 | 9/2001 | Militello et al. | |
| 6,722,478 B2 | 4/2004 | Honsberg et al. | |
| 7,594,568 B2 | 9/2009 | Hanna et al. | |

(Continued)

FOREIGN PATENT DOCUMENTS

| | | | |
|---|---|---|---|
| DE | 3823146 A1 * | 1/1990 | ........... F16D 65/123 |
| DE | 10254110 | 6/2004 | |

(Continued)

*Primary Examiner* — Xuan Lan Nguyen

(74) *Attorney, Agent, or Firm* — Greer, Burns & Crain, Ltd.

(57) ABSTRACT

A method of making a vehicle brake rotor is provided, including manufacturing a friction ring with an opening, an annular flange projecting axially relative to a face of the friction ring, and a plurality of spaced lugs projecting radially from the flange. A hub is manufactured with a plurality of recesses integrally upon the friction ring. Next, the hub is manufactured or machined so that outermost ends of the lugs are visible from an exterior of the hub.

20 Claims, 8 Drawing Sheets

(56) References Cited

U.S. PATENT DOCUMENTS

| | | |
|---|---|---|
| 7,850,251 B1 | 12/2010 | Sadanowicz |
| 7,938,378 B2 | 5/2011 | Hanna et al. |
| 7,967,115 B2 | 6/2011 | Keller |
| 7,997,391 B2 | 8/2011 | Burgoon et al. |
| 8,118,079 B2 | 2/2012 | Hanna et al. |
| 8,651,247 B2 | 2/2014 | Burgoon et al. |
| 8,720,654 B2 | 5/2014 | Kokott et al. |
| 8,955,651 B2 | 2/2015 | Karl et al. |
| 9,051,632 B2 | 6/2015 | Kim et al. |
| 2002/0139622 A1 | 10/2002 | Chen |
| 2004/0084260 A1 | 5/2004 | Hoyte et al. |
| 2006/0213732 A1 | 9/2006 | Leevy et al. |
| 2009/0020379 A1 | 1/2009 | Hanna et al. |
| 2011/0259684 A1 | 10/2011 | Kokott et al. |
| 2012/0168267 A1 | 7/2012 | Lee et al. |
| 2014/0000995 A1 | 1/2014 | Hentrich et al. |
| 2014/0069752 A1 | 3/2014 | Fakhoury |
| 2014/0151166 A1* | 6/2014 | Tironi .................. F16D 65/12 188/218 XL |
| 2014/0202803 A1 | 7/2014 | Kokott |
| 2014/0224603 A1 | 8/2014 | Kokott |
| 2015/0014104 A1 | 1/2015 | Beer et al. |
| 2015/0075925 A1 | 3/2015 | Chieh |

FOREIGN PATENT DOCUMENTS

| | | |
|---|---|---|
| EP | 1355075 | 10/2003 |
| EP | 1426644 A2 | 6/2004 |
| WO | 2013056924 | 4/2013 |

\* cited by examiner

VEHICLE BRAKE ROTOR AND METHOD OF MAKING SAME

BACKGROUND

The invention generally relates to vehicle brakes, and more specifically to an improved vehicle brake rotor, and a process for making same.

Vehicle brake rotors are known and typically include a friction ring or disc to which is fastened a hub used to connect the ring to a vehicle wheel. As is well known, friction rings have opposing friction surfaces for engagement by brake pads mounted in vehicle calipers such that each of two pads engage a corresponding surface of the friction ring under driver control to stop the vehicle. The friction ring of the vehicle brake rotor rotates about a central axis, coincident with the rotational axis of the wheel to which it is attached.

To reduce vehicle brake rotor weight, and improve the vehicle brake rotor's heat dissipation efficiency, brake rotors made of two materials have become both more popular and common, particularly among high-end vehicles. Friction rings are typically cast from a ferrous material, such as cast or grey iron. The friction rings are then machined in multiple operations to shape the rotor and form an inner mounting section and the friction surfaces. The friction surfaces of the rotor are also machined to a predetermined tolerance range.

The hub of a vehicle brake rotor is typically cast from metallic materials such as aluminum. A conventional hub further includes a centrally located bore, and a plurality of equally spaced fastener mounting holes formed circumferentially in a mounting surface around the bore. Hubs are connected to the disc body, usually with a plurality of fasteners such as rivets, or threaded fasteners, such as screws. By connecting the hub to the friction ring, fasteners keep the hub and friction ring together. As a result, fasteners aid in movement of the vehicle brake rotor.

To accurately assemble the brake rotors made of two materials, complicated equipment is needed. Due to the high level of skill needed to operate such complicated equipment, the costs of manufacturing the two material vehicle brake rotor with fasteners are high.

Another drawback of conventional bi-metallic brake rotors is that a hub made of lighter materials has a higher expansion rate than the friction ring made of cast iron. When the vehicle brake rotor undergoes high temperature conditions, expansion of the hub and the friction ring will occur. Such expansion will further occur when the vehicle brake rotor and friction rings engage. There is a concern that multi-component brake rotors will be subject to shorter operational life due to the different expansion and contraction properties of the materials used in production. Thus, there is a need for an improved technique for manufacturing vehicle brake rotors.

SUMMARY

The above-listed needs and drawbacks are addressed by an improved vehicle brake rotor designed to be constructed so that the friction ring and the hub are connected to each other without fasteners. Vehicle brake rotors made according to the present process are simpler and less expensive to manufacture. Further, vehicle brake rotors without fasteners are more reliable, and have a longer lifespan, because the possibilities of the fasteners touching the friction ring are reduced. A method for making the brake rotor without fasteners, and a brake rotor made by such a process are thus disclosed as a solution to the problems described above.

The process works by first manufacturing a friction ring conventionally made of gray iron, or other heavy metal. In a preferred embodiment, there are two of the manufactured friction rings, each having an edge and a face, and being connected by conventional materials used to join two friction rings. One of the faces of the friction rings has an annular flange projecting axially relative to the face of the friction ring. On an exterior surface of the annular flange, a preferably equally distributed plurality of spaced lugs project radially from the annular flange. An interior surface of the annular flange has an interior groove or flat surface.

The present brake rotor features the hub being integrally joined to the friction ring. The friction ring is placed into a cavity corresponding of an embed casting mold. Once this is accomplished, a molten material conventional in embed casting, such as aluminum, is poured into the cavity, and covers the lugs and the flange of the friction ring. As the molten aluminum cools, the hub is formed and is integrally joined to the friction ring. Once this is accomplished, the positive and negative chambers of the embed casting mold are removed, and the combined friction ring and hub are withdrawn from the mold. Next, an exterior peripheral edge of the hub is manufactured or machined, such that outermost ends of lugs on the annular flange are visible.

More specifically, a method of making a vehicle brake rotor is provided, including, manufacturing a friction ring with an opening, an annular flange projecting axially relative to a face of the friction ring, and a plurality of spaced lugs projecting radially from the flange. A hub is manufactured with a plurality of recesses integrally upon the friction ring. Next, the hub is manufactured or machined so that outermost ends of the lugs are visible from an exterior of the hub.

In another embodiment, a vehicle brake rotor is provided, including a friction ring with an opening, an annular flange projecting axially relative to a face of the friction ring that defines the opening and a plurality of spaced lugs projecting radially from the flange. A hub is provided with a plurality of recesses matingly engaging the lugs, an endcap covering the opening of the hub, and the hub is integrally joined to the friction ring. After machining or manufacturing the hub, outermost ends of the lugs of the brake rotor are visible from an exterior of the hub.

In yet another embodiment, a vehicle brake rotor manufactured by a process is provided, including the steps of manufacturing a friction ring with an opening, an annular flange projecting axially relative to a face of the friction ring, and a plurality of spaced lugs projecting radially from the flange. Manufacturing a hub with a plurality of recesses upon the friction ring, each recess engaging a corresponding lug, and joining the hub integrally to the friction ring. The hub is then machined or manufactured so that outermost ends of the lugs are visible.

DETAILED DESCRIPTION

Figure 1:
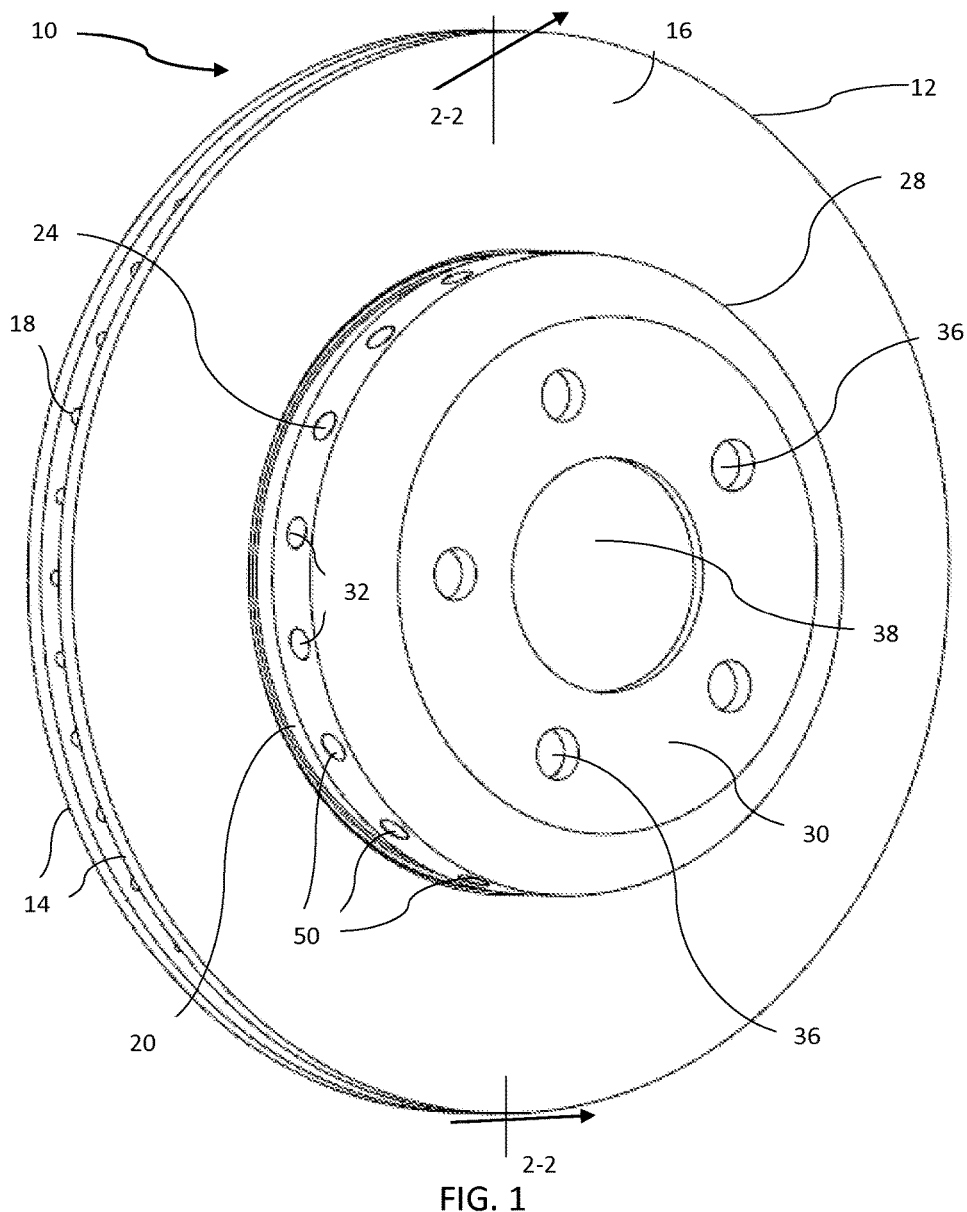
FIG. 1 is a front perspective view of an assembled friction ring, and a hub forming the present vehicle brake rotor.
Figure 2:
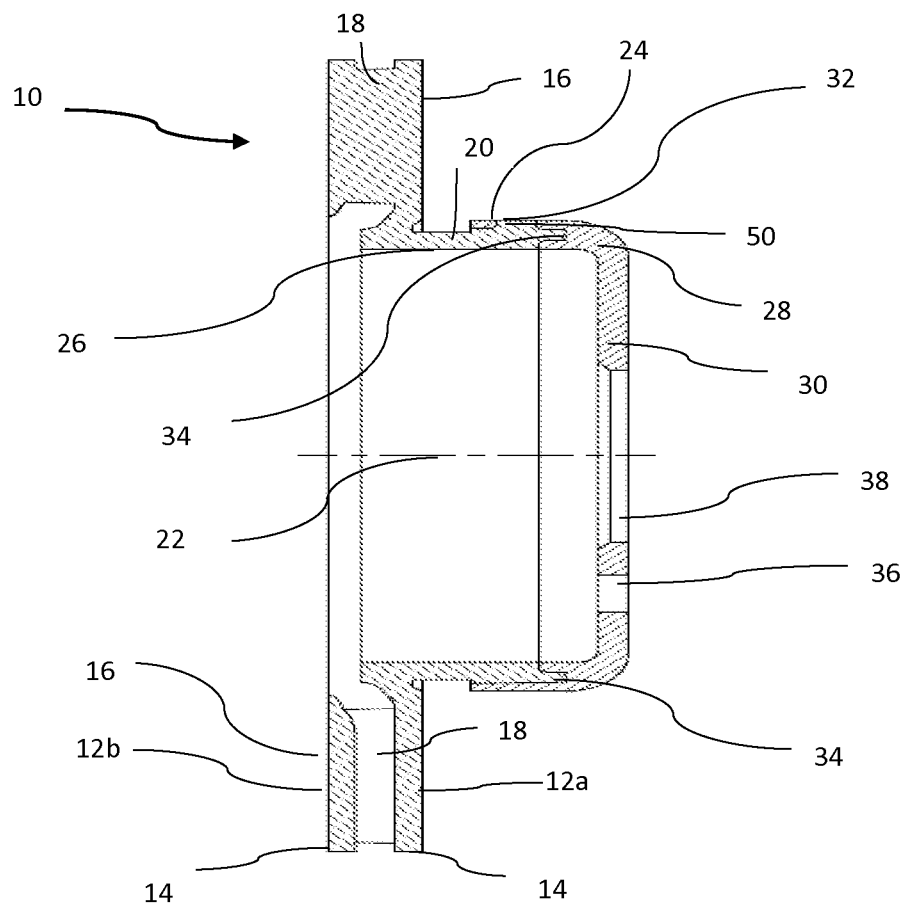
FIG. 2 is a vertical cross-section taken along the line 2-2 of FIG. 1 and in the direction generally indicated.
Figure 3:
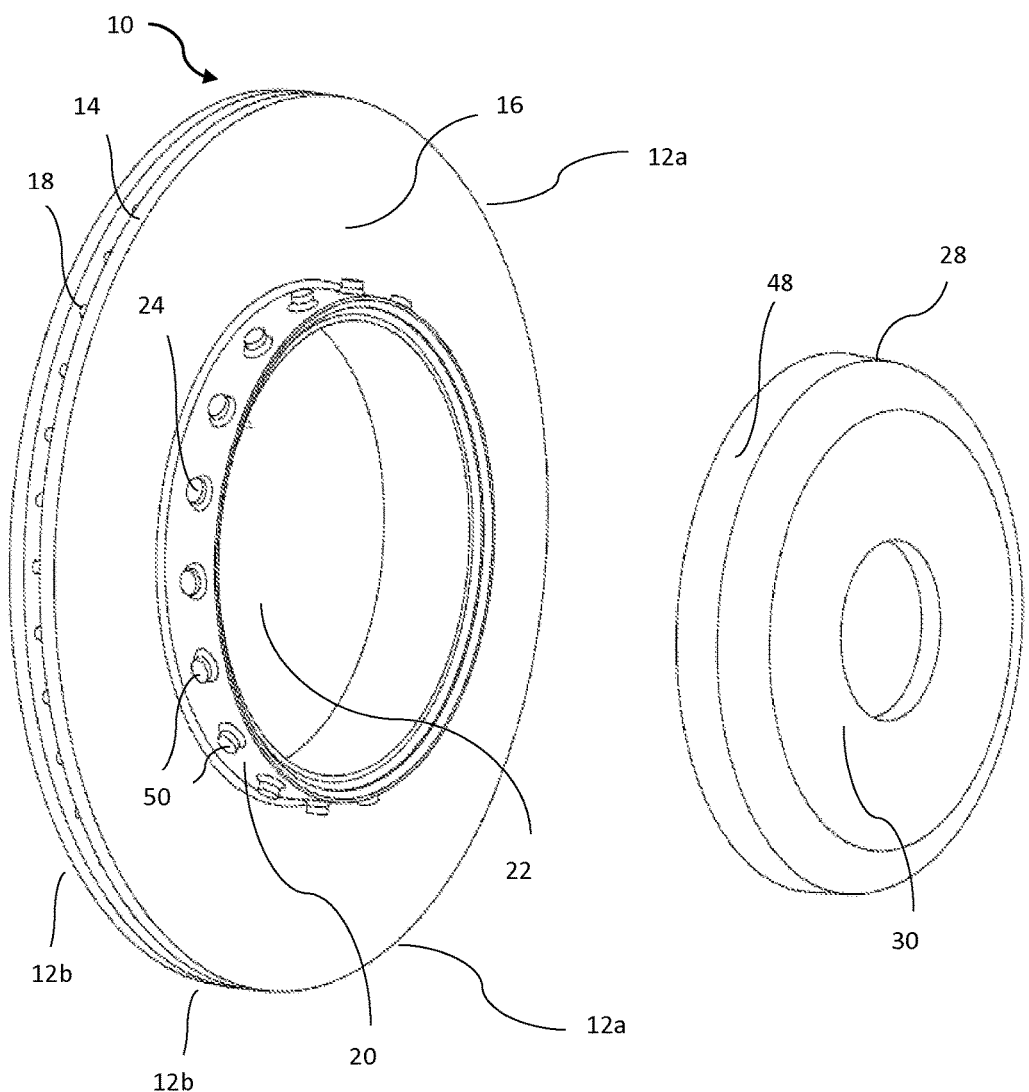
FIG. 3 is an exploded front perspective view of the present friction ring and the hub before the friction ring and hub are integrally joined.

Referring now to FIGS. 1-3, the present vehicle brake rotor, generally designated 10, is configured to be mounted to a vehicle wheel, not shown. As is known in the art, the rotational axis of the vehicle brake rotor 10 is coincident with the rotational axis of the wheel to which it is attached.

The present vehicle brake rotor 10 has a friction ring 12. In the preferred embodiment, the friction ring 12 is made of gray iron, or other suitable metals, alloys or other materials used in conventional friction rings. The friction ring 12 is also made up of a pair of generally parallel plates 12a and 12b, each having an edge 14, and a face 16. Joining the friction rings 12a and 12b is a plurality of connectors 18. On the face 16 of the friction ring 12a are an axially projecting annular flange 20, and an opening 22 of the friction ring defined by the annular flange 20. Projecting radially from the axially projecting annular flange 20 is a plurality of lugs 24. The annular flange 20 also includes an interior wall 26. A hub 28 is integrally joined to the flange 20, preferably by embed casting. In the preferred embodiment, the hub is composed of aluminum or other metals. On top of the hub 28 is an endcap 30.

Casting the hub 28 upon the friction ring 12 produces a plurality of recesses 32, which matingly engage the lugs 24 projecting radially from the annular flange 20. The hub 28 also engages the annular flange 20 via an interior groove 34. The lugs 24 are concentric with the recesses 32 on hub 28, and are preferably spaced equidistantly. While in the preferred embodiment the lugs 24 are generally cylindrical in shape, other shapes are contemplated, including various polygonal shapes (when viewed in transverse cross-section). As seen in FIG. 3, after the hub 28 is cast, the lugs 24 are completely covered by the hub.

The rotor 10 is mounted to the vehicle wheel using mounting holes 36 in the endcap 30, and a central opening 38 engages an axle shaft (not shown). The vehicle brake rotor 10 is mounted to a wheel of, for example, an automotive vehicle on the inboard side of the wheel, with respect to the assembled vehicle, for stopping the rotation of the wheel in operation of the vehicle. Conventionally, four such vehicle brake rotors 10 are used on a vehicle, one with each of the four wheels. However, some older vehicles are equipped with only two front disk brakes, the rear brakes being drum-type.

Figure 4:
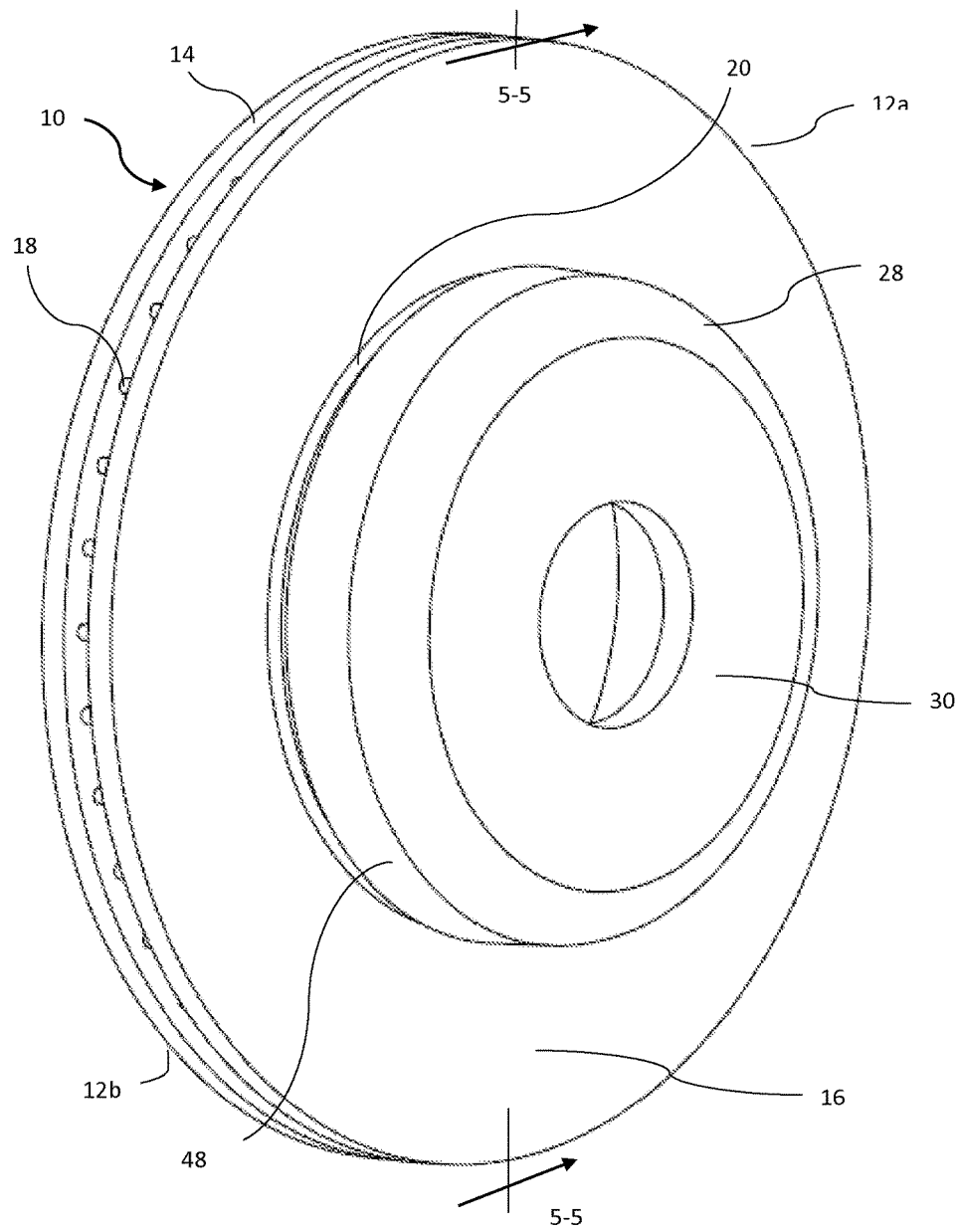
FIG. 4 is a front perspective of the present vehicle brake rotor with the hub integrally formed upon the friction ring, preferably via embed casting.
Figure 5:
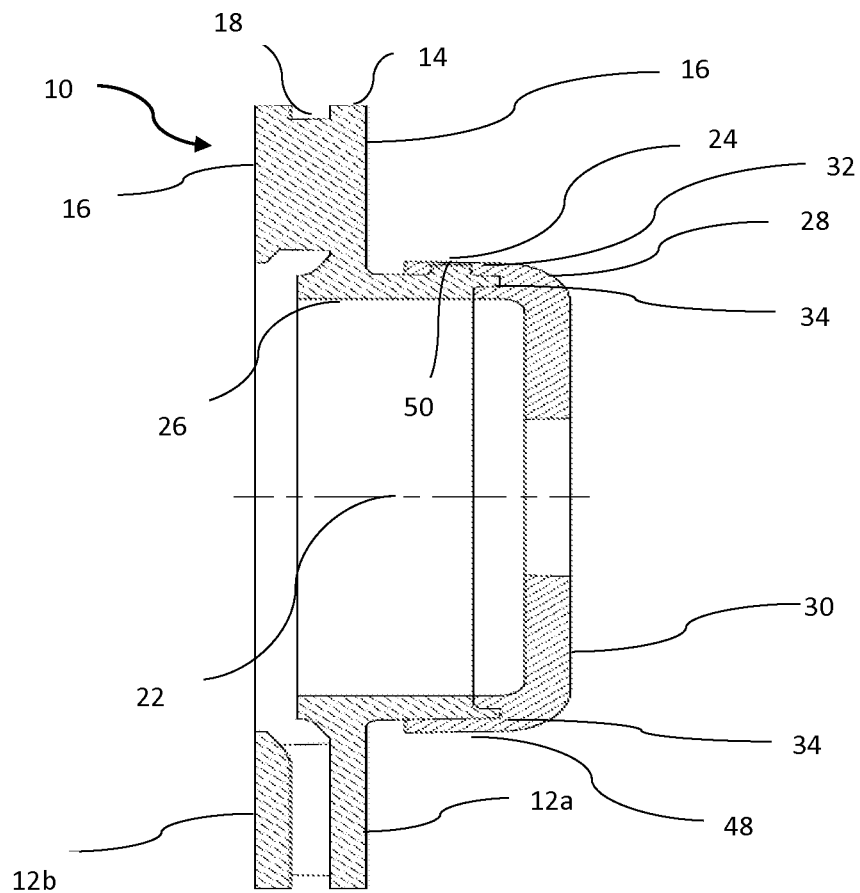
FIG. 5 is a vertical cross-section taken along the line 5-5 of FIG. 4 and in the direction generally designated.

Referring now to FIGS. 4 and 5, the vehicle brake rotor 10 is shown integrally joined to the friction ring 12 before the hub 28 is manufactured or machined. In this application, "manufactured" will be understood to refer to any of a variety of fabricating steps commonly known to skilled practitioners, including casting, grinding, fastening, or the like. As the hub 28 is joined integrally to the friction ring 12 the endcap 30 on the hub partially covers the opening 22. As seen in FIG. 3, the lugs 24 are completely covered by the hub 28.

Figure 6:
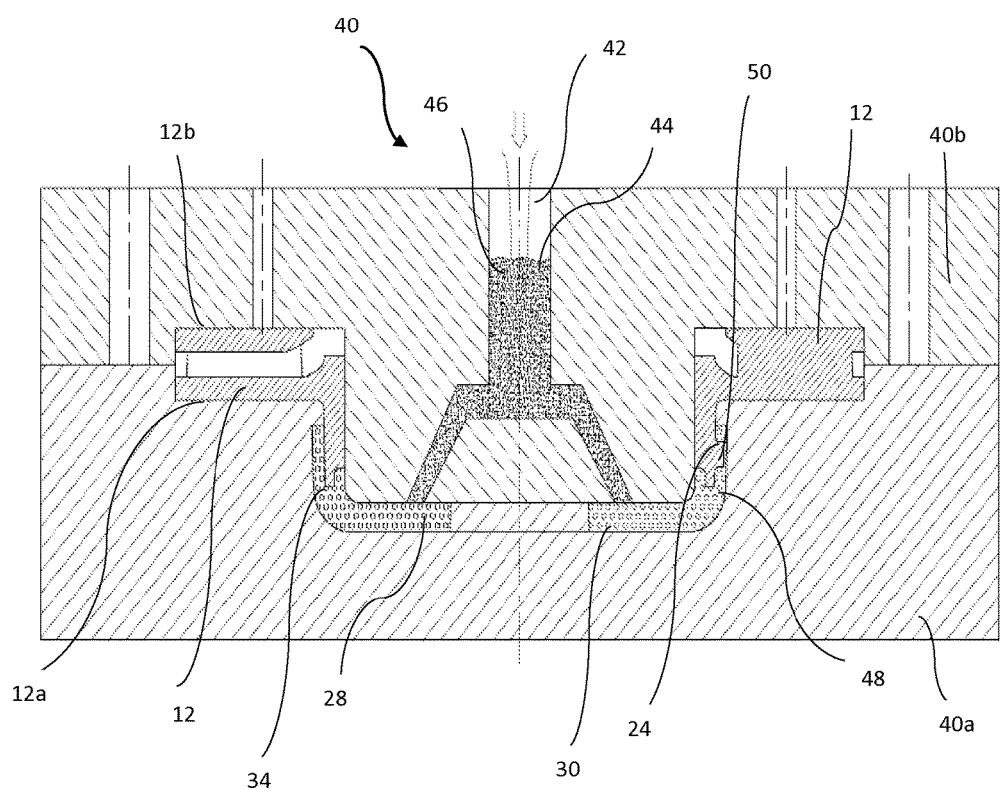
FIG. 6 is a vertical cross-section of an embed casting mold used to make the present vehicle brake rotor.

Referring now to FIG. 6, in the preferred embodiment of the present vehicle brake rotor 10, the friction ring 12 and the hub 28 are integrally joined by embed casting, using a mold generally designated 40, including two mating portions 40a, 40b as is well known in the art. Once the friction ring 12 is cast and suitably machined, it is placed into a corresponding cavity 42 of the mold 40. A molten material 44, typically aluminum, or another suitable alloy, is then poured into a chamber 46 of the embed casting mold 40. As the molten material 44 flows down the chamber 46, it forms the hub 28, The high temperatures of the molten material 44 cause the friction ring 12 to expand, and interior groove 34 of the hub matingly engages the flange 20. Also, the lugs 24 matingly engage the recesses 32, located in a skirt 48 of the hub 28.

After the molten material 44 cools, the friction ring 12 and the hub 28 are integrally joined to each other, and the lugs 24 are matingly received in the recesses 32. After cooling, the joined hub 28 and friction ring is then machined so that outermost ends 50 of the lugs 24 are visible from an exterior of the rotor 10 (FIGS. 1 and 2). While in the preferred embodiment, the ends 50 are circular, other shapes are contemplated, depending on the cross-sectional geometry of the lugs 24 as discussed above.

Figure 7:
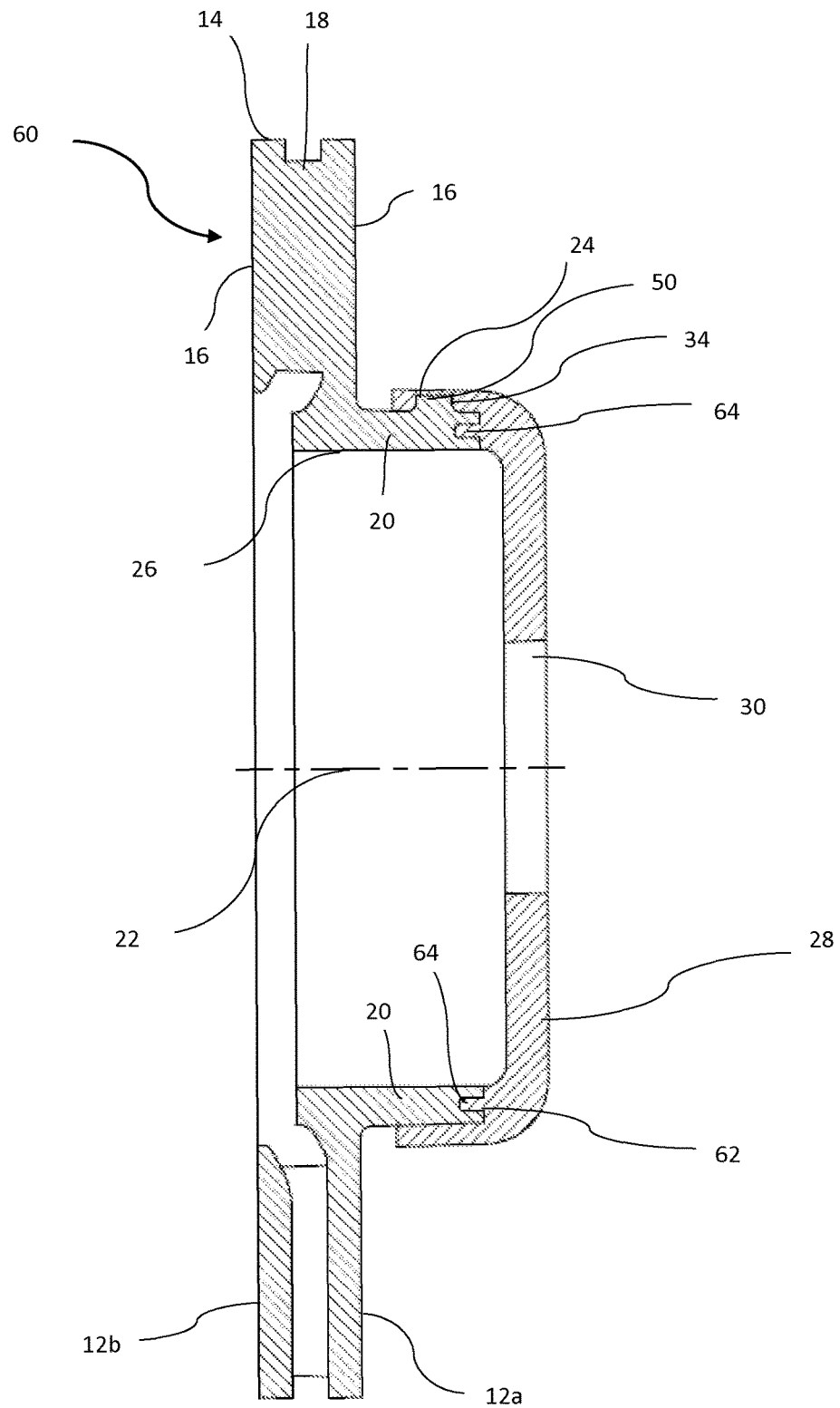
FIG. 7 is a vertical cross-section of another embodiment of the present vehicle brake rotor.

Referring now to FIG. 7, an alternate embodiment of the present vehicle brake rotor 10 is generally designated 60. Components shared with the rotor 10 are designated with identical reference numbers. A major difference between the rotor 60 and the rotor 10 is that the flange 20 is provided with an annular groove 62 which matingly engages a corresponding annular tongue 64 in the hub 28.

Figure 8:
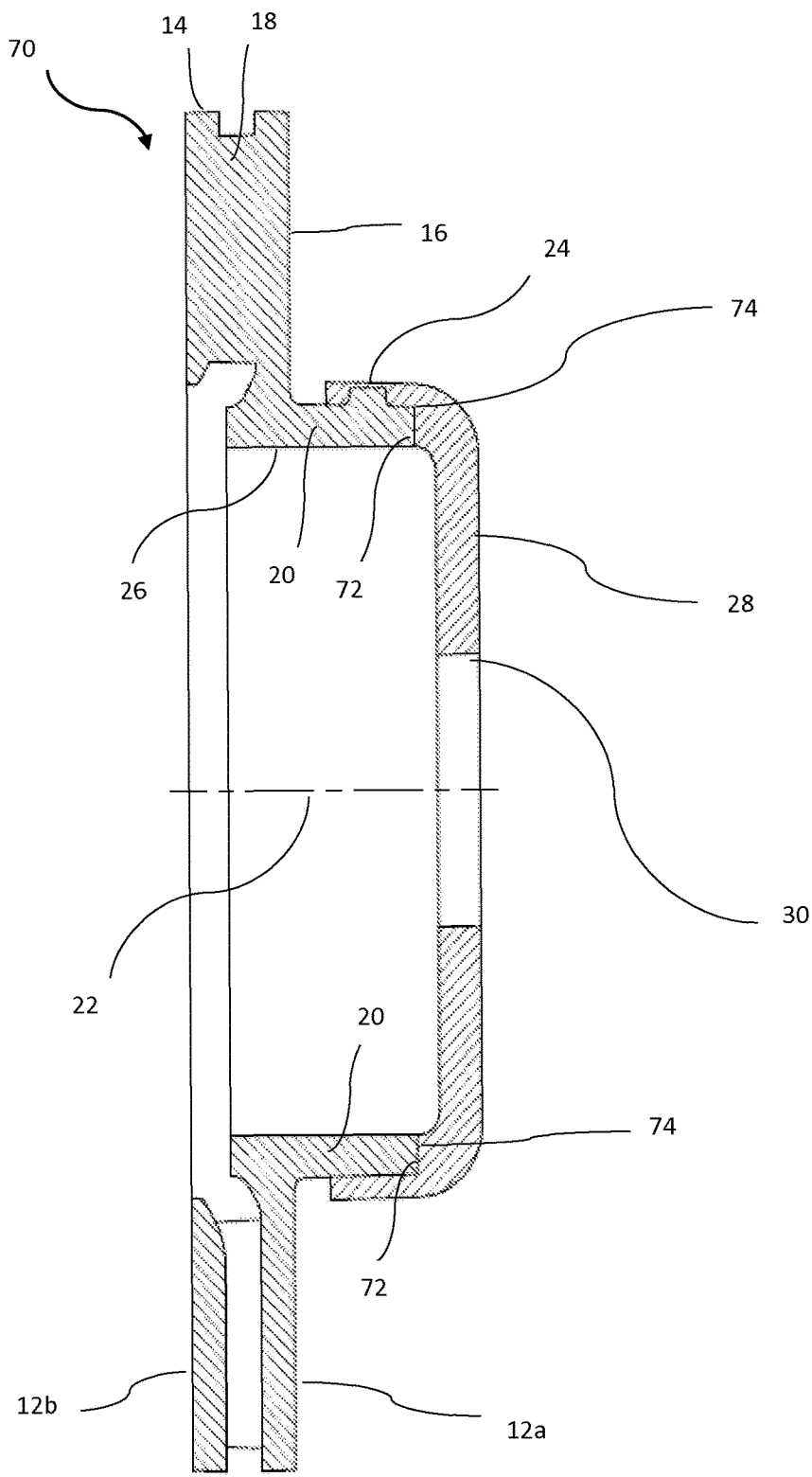
FIG. 8 is a vertical cross-section of still another embodiment of the present vehicle brake rotor.

Referring now to FIG. 8, another alternate embodiment of the present vehicle brake rotor 10 is generally designated 70. Components shared with the rotors 10 and 60 are designated with identical reference numbers. A main feature of the rotor 70 is that the annular flange 20 is provided with an outermost flat surface 72 that engages a corresponding flat surface 74 on the hub 28.

While a particular embodiment of the vehicle brake rotor and method of making same has been described herein, it will be appreciated by those skilled in the art that changes and modifications may be made thereto without departing from the invention in its broader aspects and as set forth in the following claims.

The invention claimed is:

1. A method of making a vehicle brake rotor, comprising:
    manufacturing a friction ring with an opening, an annular flange projecting axially relative to a face of the friction ring, and a plurality of spaced lugs projecting radially from the flange;
    manufacturing a hub with a plurality of recesses integrally upon said friction ring so that outermost ends of said lugs are not visible from an exterior of said hub; and
    then manufacturing said hub on said friction ring so that said outermost ends of the lugs are visible from an exterior of said hub.

2. The method of claim 1, wherein the friction ring is made of gray iron.

3. The method of claim 1, wherein the lugs of the friction ring are concentric with the recesses on the hub, and are spaced equidistantly.

4. The method of claim 1, wherein the flange defines the opening.

5. The method of claim 1, wherein said lugs are generally cylindrical in shape and matingly engage with said recesses.

6. The method of claim 1, wherein said hub is manufactured integrally upon said friction ring by embed casting.

7. The method of claim 6, wherein said hub is provided with an endcap covering said opening.

8. The method of claim 6, wherein the hub is made of aluminum.

9. The method of claim 1, wherein manufacturing said hub on said friction ring so that said lugs are visible from an exterior of said hub occurs by machining said hub.

10. A method of making a vehicle brake rotor, comprising:
    manufacturing a friction ring with an opening, an annular flange projecting axially relative to a face of the friction ring, and a plurality of spaced lugs projecting radially from the flange;
    manufacturing a hub with a plurality of recesses integrally upon said friction ring so that outermost ends of said lugs are not visible from an exterior of said hub; and
    then manufacturing said hub on said friction ring so that said outermost ends of the lugs are visible from an exterior of said hub,
    wherein the hub is made of aluminum, and,
    wherein manufacturing said hub on said friction ring so that said lugs are visible from an exterior of said hub occurs by machining said hub.

11. The method of claim 10, wherein the friction ring is made of gray iron.

12. The method of claim 10, wherein the lugs of the friction ring are concentric with the recesses on the hub, and are spaced equidistantly.

13. The method of claim 10, wherein the flange defines the opening.

14. The method of claim 10, wherein said lugs are generally cylindrical in shape and matingly engage with said recesses.

15. The method of claim 10, wherein said hub is manufactured integrally upon said friction ring by embed casting.

16. The method of claim 15, wherein said hub is provided with an endcap covering said opening.

17. A method of making a vehicle brake rotor, comprising:
    manufacturing a friction ring with an opening, an annular flange projecting axially relative to a face of the friction ring, and a plurality of spaced lugs projecting radially from the flange;
    manufacturing a hub with a plurality of recesses integrally upon said friction ring so that outermost ends of said lugs are not visible from an exterior of said hub; and
    then manufacturing said hub on said friction ring so that said outermost ends of the lugs are visible from an exterior of said hub,
    wherein said lugs are generally cylindrical in shape and matingly engage with said recesses, and,
    wherein the friction ring is made of gray iron.

18. The method of claim 17, wherein the lugs of the friction ring are concentric with the recesses on the hub, and are spaced equidistantly.

19. The method of claim 17, wherein said hub is manufactured integrally upon said friction ring by embed casting.

20. The method of claim 19, wherein manufacturing said hub on said friction ring so that said lugs are visible from an exterior of said hub occurs by machining said hub.

* * * * *